(No Model.)
J. MILLER.
HOSE COUPLING.
No. 387,899. Patented Aug. 14, 1888.
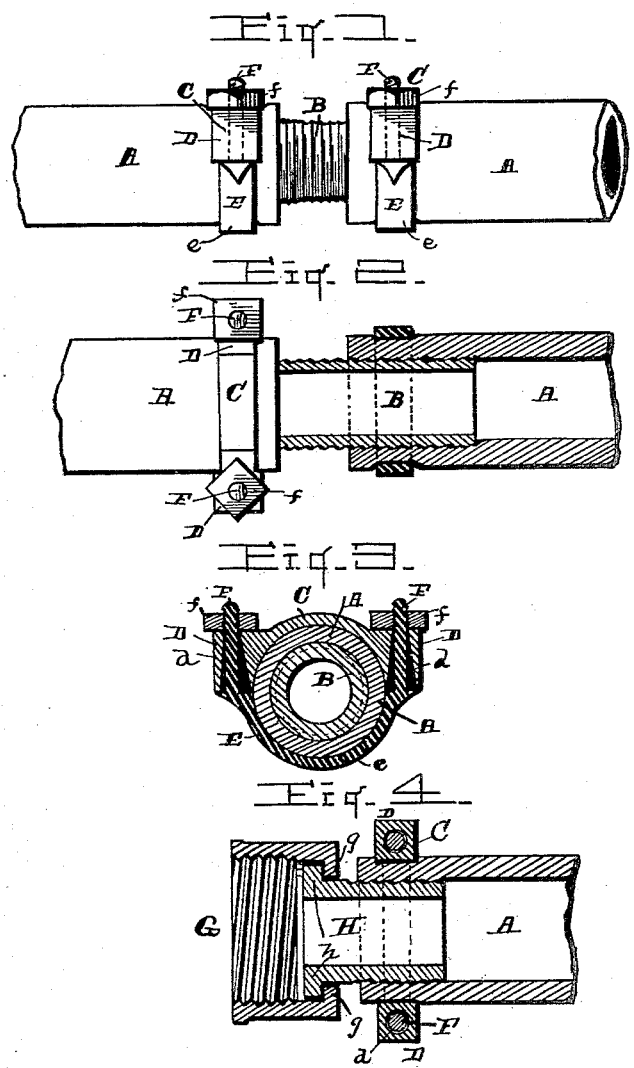
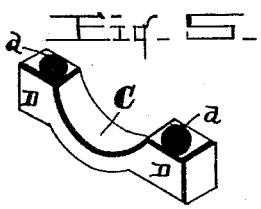
Witnesses.
A. E. Dowell.
P. L. Brooks.
Inventor.
James Miller.
By his Attorney J. A. Alexander.

UNITED STATES PATENT OFFICE.

JAMES MILLER, OF SOUTH BEND, INDIANA.

HOSE-COUPLING.

SPECIFICATION forming part of Letters Patent No. 387,899, dated August 14, 1888.

Application filed May 11, 1888. Serial No. 273,607. (No model.)

*To all whom it may concern:*

Be it known that I, JAMES MILLER, of South Bend, in the county of St. Joseph and State of Indiana, have invented certain new and useful Improvements in Hose-Couplings; and I do hereby declare that the following is a full, clear, and exact description thereof, reference being had to the accompanying drawings, and to the letters of reference marked thereon, which form part of this specification, in which—

Figure 1 is a side view of my improved hose-coupling. Fig. 2 is a longitudinal section of the same. Fig. 3 is a cross-section. Fig. 4 is a sectional view of a modification. Fig. 5 is a perspective view of the coupler-yoke detached.

This invention is an improved hose-coupling; and it consists in the novel construction of parts and their peculiar arrangement, as hereinafter described, illustrated in the drawings, and specifically set forth in the appended claim.

Referring to the drawings, A A represent sections of a hose, and B is a metallic sleeve, preferably grooved or otherwise roughened on its exterior, as shown.

C is a concavo-convex flexible yoke having at its ends projecting angular lugs D D on its convex face. Through each of these lugs is a conical perforation or opening, *d*, as shown.

E is a clip, made preferably of yielding metal, and having a concavo-convex portion, *e*, the ends F of which are reduced, forming lugs, and screw-threaded, as shown.

*f f* are nuts for engaging on lugs F.

When a hose becomes broken, so that it leaks, the defective portion is cut out and the ends of sleeve B are inserted in the ends of the sections, as shown. The yoke C and clip E are then adjusted around the ends of the hose-sections, as shown, the lugs F of the clip being passed through the openings of the yoke-shoulders. Nuts *f* are then engaged on said lugs and tightened, drawing the yoke and clip together, and clamping the yoke upon the sleeve, embedding the hose in the surface grooves of the sleeve and producing a water-tight joint. These devices are applied to each hose-section to connect them to the sleeve. The shoulders D afford a firm flat bearing for the nuts *f*, and the openings allow the engagement of the yoke and clip, and also insure the equal compression of the hose upon the sleeve around its entire circumference, as shown. The yielding qualities of the yoke and clip permit them to adjust themselves to the slightly-varying size of hose.

In Fig. 4, (which illustrates the manner of attaching the hose to any ordinary swivel-screw-coupling joint,) G is a threaded cup having interior screw-threads and at one end an annular shoulder, *g*. H is a sleeve slipped through cup G and engaging shoulder *g* by an annular flange, *h*. The exterior surface of sleeve H is roughened, and, after passing it through the cup G until its flange *h* engages shoulder *g*, the end of the hose is slipped over the end of the sleeve and secured thereto by a yoke and clip in the manner described.

The herein-described coupling devices are easily applied wherever a coupling is needed. They are also especially useful in accidents to fire-hose. The yoke and clip can also be used to clamp split or spliced rods, &c. The holes through the lugs of the yoke may, as is evident, be made cylindrical, though I prefer to make them conical, as described.

Having described my invention, I claim—

The combination of the hose-sections and the sleeve B, engaging the same, with the yoke C, having perforated shoulders D, the clip E, having a curved portion, *e*, screw-threaded lugs F, passed through the perforations in shoulders D, and nuts *f*, all constructed and arranged substantially in the manner and for the purpose described.

In testimony that I claim the foregoing as my own I affix my signature in presence of two witnesses.

JAMES MILLER.

Witnesses:
JAMES DUSHANE,
JEANIE ANDERSON.